J. Gould,
Bee Hive.
No. 98,761. Patented Jan. 11, 1870.
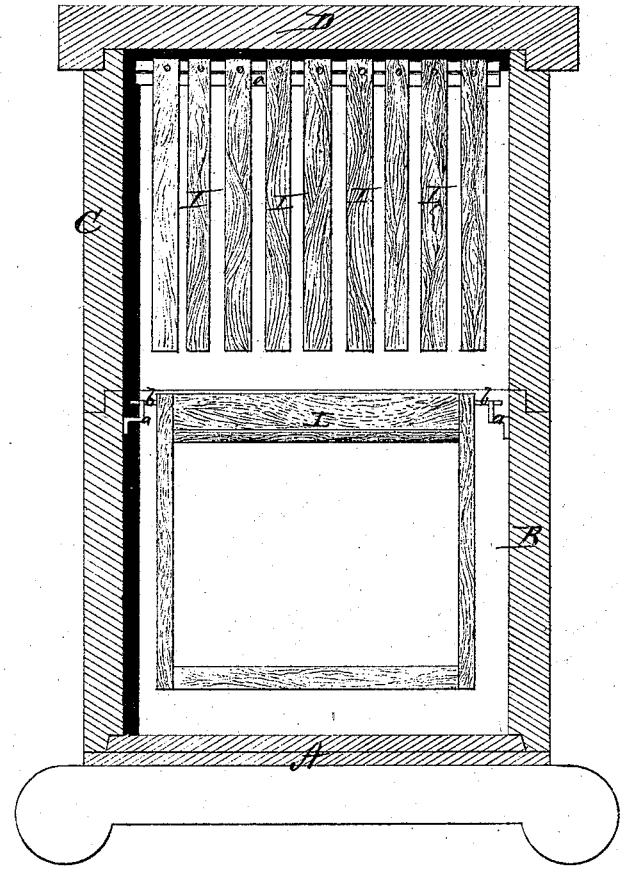
Witnesses
F. Lehmann
C. L. Evert
Inventor.
Joseph Gould
by Alexander␣␣␣
Attys

UNITED STATES PATENT OFFICE.

JOSEPH GOULD, OF GRINNELL, IOWA.

IMPROVEMENT IN BEE-HIVES.

Specification forming part of Letters Patent No. 98,761, dated January 11, 1870.

*To all whom it may concern:*

Be it known that I, JOSEPH GOULD, of Grinnell, in the county of Poweshiek, and in the State of Iowa, have invented certain new and useful Improvements in Bee-Hives; and do hereby declare that the following is a full, clear, and exact description thereof, reference being had to the accompanying drawings, and to the letters of reference marked thereon, making a part of this specification.

The nature of my invention consists in the construction and arrangement of a bee-hive, which can be adapted to large or small swarms at pleasure.

In order to enable others skilled in the art to which my invention appertains to make and use the same, I will now proceed to describe its construction and operation, referring to the annexed drawing, which represents a vertical section of the hive.

A represents the bottom or stand of the hive, on which the box B rests. This box, like the stand A, may be made of any size desired, the box being made without top and bottom. On top of the box B is placed a similar box, C, and on top of the latter box is the cover D.

The joints between the stand, boxes, and cover are made all alike, in such a manner as to exclude air and water, and so that the boxes or sections can be changed from one hive to another, from top to bottom, or still more boxes put on, making the hive any size that may be desired.

It makes no difference which section is on top or at the bottom. All fit into each other, and the cover fits all sections alike.

It is a very important thing in a hive to control the size. This hive divides in such a manner that it can be diminished or enlarged at will. If the swarm is weak, it can be brought into one section, which condenses the heat, when the bees will breed faster. Then, when they need more room, give them another section, by putting the empty section on the stand, and the bees in the top section, when they will fill the bottom section. When there is enough bees and honey for two swarms, take the sections apart, with bees and honey in each, and give each section of bees an empty section, and the swarm is divided without any risk of their not getting filled up enough to winter, if the season should prove poor.

Near the top of each section, on two sides, are strips $a$ $a$, made of tin, in the peculiar shape shown in the lower section of the drawing.

The upper edges of these strips are provided with a series of notches, in which rest the pins $b$ $b$, which project from the comb-frames I I. The comb-frames I I are made in any of the known and usual ways, and by hanging them in the manner just described considerable expense is saved.

Having thus fully described my invention, what I claim as new, and desire to secure by Letters Patent, is—

1. The angular metallic strips $a$ and pins $b$, in combination with the frames I, substantially as set forth.

2. The combination of the rabbeted sections and parts A B C D, frames I, pins $b$, and angular plates $a$, all as set forth.

In testimony that I claim the foregoing I have hereunto set my hand this 19th day of July, 1869.

JOSEPH GOULD.

Witnesses:
J. H. SCOTT,
CHAS. H. SPENCER.